Jan. 10, 1961 B. A. AULD 2,968,013

HOLLOW ELECTRICAL RESONATORS

Filed Sept. 28, 1956 2 Sheets-Sheet 1

Inventor
B. A. Auld
By Glascock Downing & Seebold
Attys.

HOLLOW ELECTRICAL RESONATORS

Filed Sept. 28, 1956 2 Sheets-Sheet 2

Inventor
B. A. Auld
By Glascock Downing & Seebold
Attys.

United States Patent Office 2,968,013
Patented Jan. 10, 1961

2,968,013

HOLLOW ELECTRICAL RESONATORS

Bert Alexander Auld, Vancouver, British Columbia, Canada, assignor to Electric & Musical Industries Limited, Middlesex, England, a company of Great Britain Filed Sept. 28, 1956, Ser. No. 612,654

9 Claims. (Cl. 333—83)

This invention relates to hollow electrical resonators.

Figure 1:
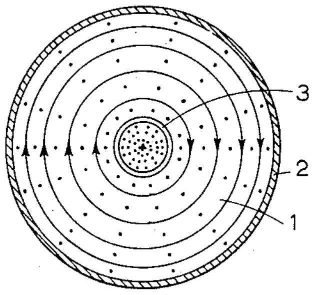
Figure 2:
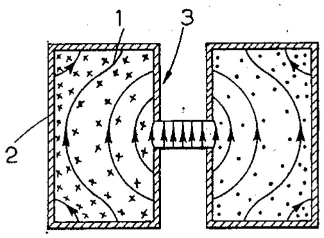
Figure 3:
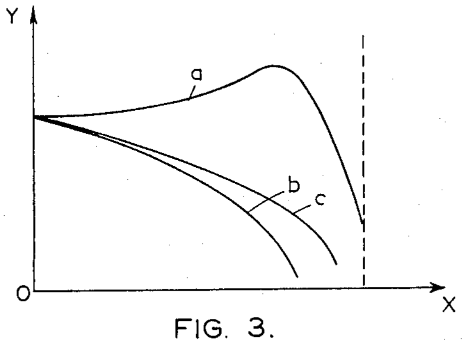

Figures 1 and 2 of the accompanying drawings illustrate diagramamtically in sectional plan view and sectional elevation a hollow electrical resonator 1 having side wall 2 and a re-entrant part 3 which forms a capacitive gap, such as used for example in klystrons where it is required that the resonator forms an integral part of a vacuum envelope and that the gap spacing be constant. In Figure 1 the full lines within the resonator represent lines of magnetic force when the resonator is excited in the fundamental mode, whilst in Figure 2 the full lines represent lines of electrical force. It will be observed that the lines of magnetic force are circles about the axis of the resonator. It has been proposed to tune such a resonator by means of a cylindrical metal plunger inserted through the side wall 2, and the plunger penetrates into the resonator towards the axis the volume displacement effect of the plunger reduces the inductance of the cavity and the resonant frequency increases. For small penetrations of the plunger into the resonator, the inductive tuning predominates the capacitive changes being compartively small. However as the plunger penetrates still further capacitive tuning becomes predominant since the plunger penetrates increasingly into the strong electric field near the gap. Thus the capacitance tuning counteracts and eventually exceeds the inductive tuning causing a reduction of the resonant frequency. This effect is illustrated by the curve *a* in Figure 3 in which *x* represents the penetration of the plunger from the side wall 2 of the resonator, and *y* represents the resonant frequency. The dotted line in Figure 3 represents the edge 3 of the re-entrant part of the cavity. The curve *a* is highly non-linear and only the first part of it represents a useful tuning range. It has also been proposed to replace the plunger by a vane inserted a fixed distance into the resonator and rotatable about an axis normal to the axis of the resonator. When the vane is parallel to the magnetic field the field is only slightly disturbed and the resonant frequency is a minimum but when the vane is turned so as to be normal to the magnetic field the magnetic field is considerably disturbed and the resonant frequency is a maximum. The amount of inductance tuning obtained by this arrangement is about the same as for a metal cylinder whose diameter equals the width of the vane and can penetrate to the same distance into the resonator.

The foregoing proposals have the disadvantage that the useful tuning range which can be obtained with a single plunger or vane is relatively small, being about 2 percent or 3 percent of the centre frequency, and the object of the present invention is to provide a resonator, which has a re-entrant part, with tuning means which can give an increased tuning range without an excessively large rate of tuning.

According to the present invention there is provided a hollow electrical resonator having a re-entrant part and having tunning means comprising a conductive means describing a lamina facing said re-entrant part and movable within the resonator from between an outer zone and the re-entrant part thereof, at least a substantial part of the path swept by said plate-like means passing, when produced, on one side of said re-entrant part.

Preferably the plate-like means comprises two wing portions disposed so that a substantial part of said produced path passes on opposite sides of said re-entrant part, and in one form of the invention, said wing portions are spaced apart to reduce the part of said produced path which is intercepted by the re-entrant part of the cavity.

Figure 4:
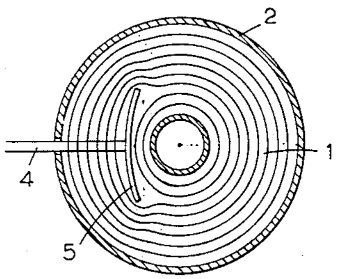
Figure 5A:
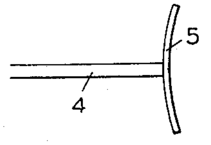
Figure 5B:
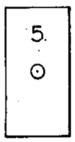
Figure 6A:
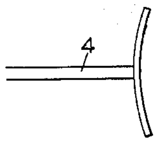
Figure 6B:
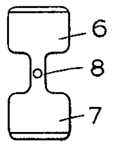
Figure 7A:
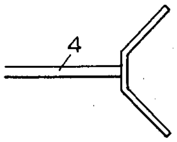
Figure 7B:
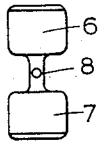
Figure 8:
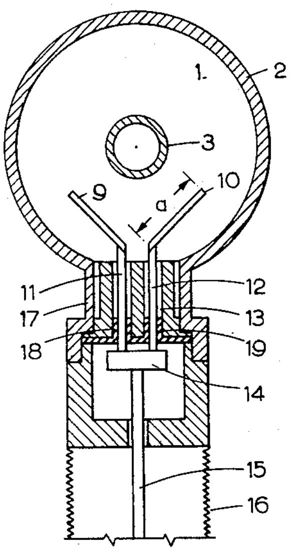
Figure 9:
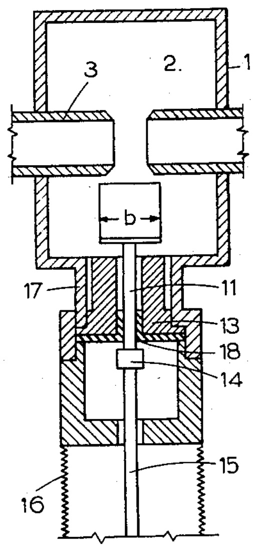

In order that the invention may be clearly understood and readily carried into effect, the invention will now be described with reference to the accompanying drawings, Figures 1 to 3 of which have already been referred to, and in which:

Figure 4 illustrates in sectional plan view one example of a resonator according to the present invention, Figures 5(*a*) and 5(*b*) are a plan and an end view of the tuning means employed in the resonator of Figure 4, Figures 6(*a*) and 6(*b*) are a plan and end view of an alternative form of tuning means which can be used in the resonator according to Figure 4, Figures 7(*a*) and 7(*b*) are a plan and end view of another alternative form of tuning means, Figure 8 is a sectional plan view of a preferred form of resonator, showing details of the mounting for the tuning means, and Figure 9 is a sectional elevation of Figure 8.

Referring to Figure 4, the resonator 1 which is of the form shown in Figures 1 and 2 has tuning means comprising a thin rod 4 attached to the end of which is a conductive means which describes a lamina. In the present example the conductive means is a rectangular plate 5 as shown in Figures 5(*a*) and 5(*b*) attached to the end of the rod within the resonator, the plate being slightly curved as shown in Figure 5(*b*). With tuning means of this form the inductive tuning effect is relatively small because the volume of the rod is small and the plate 5 is essentially parallel to the magnetic field throughout a considerable part of its travel. However as the plate 5 approaches the axis of the resonator it presents an increasing projected area normal to the magnetic field, because of the increase in curvature of the lines of force. Thus the magnetic field is displaced by the plate and a degree of inductive tuning is introduced which tends to compensate for the capacitive tuning where it would otherwise be too rapid. The tuning is therefore mainly capacitive over the entire travel of the plate 5 and inductive tuning is employed only to prevent an excessive rate of tuning for large penetrations of the plunger into the resonator, a representative tuning characteristic being shown by the curve *b* of Figure 3.

In the arrangement of Figures 4 and 5 the improved tuning characteristic arises because a substantial part of the path swept by the conductive means 5, when produced beyond the re-entrant part 3 of the resonator, passes to one side or the other of the re-entrant part. The non-linearity in the capacitive tuning can be further reduced by removing part of the plate 5 between the outer or wing portions thereof as shown in Figures 6(*a*) and 6(*b*). This produces plate-like tuning means comprising two wing portions 6 and 7 and a relatively narrow portion 8 connecting the wing portions 6 and 7, the effect being to reduce the part of the produced path of the tuning means which is intercepted by the re-entrant part 3 of the cavity, thereby reducing the area of metal near the re-entrant part 3. This in turn reduces the rapid increase in capacity near the inner end of the travel of the tuning means, a representative tuning characteristic being shown at *c* in Figure 3.

Still further linearisation of the tuning characteristic can be produced by folding the wing portions 6 and 7 inwards towards the re-entrant part 3, as represented by Figures 7(*a*) and 7(*b*). The portions of the tuning means which produce the greatest tuning effect now approach the re-entrant part 3 partly in tangential directions and this has been shown to produce a very linear tuning characteristic. Satisfactory results have been produced with the portions 6 and 7 folded to include an angle of about 90 degrees.

In one practical form of the invention shown in Figures 8 and 9, a conductive tuning means is made in two separate plates 9 and 10, omitting the connecting portion shown in Figures 6 and 7. Each plate is mounted on a separate rod, the rods being denoted by the references 11 and 12. This makes it possible to insert the plates individually into the resonator through a hole smaller than the overall span of the two plates.

The plates are made flat and when finally assembled are mounted at an angle to each other, so as to include an angle of 90 degrees, which further simplifies the construction. The rods 11 and 12 are slidably supported by a plug 13 which is inserted after the rods into the hole in the resonator wall, quartz bushes 18 and 19 being inserted between the rods 11 and 12 and the plug 13. The plug 13 is then fixed to the resonator and the rods 11 and 12 are fastened together by a yoke 14 thus forming a single unit which can be manipulated in a usual manner by means of a rod 15 attached to bellows 16. The sliding contact between the plug 13 and the rods 11 and 12, and the fixed contact between the plug 13 and resonator wall are isolated from the fields within the resonator because, due to the symmetry of the arrangement, the fundamental modes are not excited on the coaxial transmission lines formed by the parts 11, 12 and by the part 17 of the resonator.

One practical form of the resonator shown in Figures 8 and 9 has the following approximate dimensions. The diameter is 48.3 mm. the internal diameter of the re-entrant part is 10 mm. and the external diameter is 12 mm. The dimension *a* of the plates 9 and 10 is 15.9 mm. the dimension *b* is 12.7 mm. the plates are 1 mm. thick and the total travel of the plates is 12.7 mm. The diameter of the rods 11 and 12 is 2 mm. The re-entrant part 3 forms the drift tube of a klystron valve. The resonant frequency of the resonator is about 3,000 mc./s. and effective tuning range is 350 mc./s., which is about 12 percent of the resonant frequency. The tuning is substantially linear throughout this range. With the arrangement, shown in Figures 8 and 9 the volume displacement of the tuning means is virtually constant throughout the travel of the tuning means, so that variations in inductive tuning are caused mainly by variations in the magnetic field, which increases in intensity towards the re-entrant part 3 of the cavity.

Clearly many variations are possible in the form of the plate-like tuning means.

What I claim is:

1. A hollow electrical resonator having a re-entrant part and comprising conductive tuning means describing a lamina facing said re-entrant part, and means for producing tuning movement of said conductive means from an outer zone of the resonator to the re-entrant part thereof and vice versa, said tuning means having a substantial effective area normal to the direction of tuning movement so that, at least a substantial part of the path swept by said conductive means on movement thereof when the path is produced past the re-entrant part, lying to one side of said re-entrant part, said conductive means being dimensioned to cause capacitive tuning of said resonator in response to movement of said conductive means, together with inductive tuning substantially counteracting an increase in the capacitive tuning rate as the conductive means approaches said re-entrant part.

2. A hollow electrical resonator having a re-entrant part and having tuning means comprising two conductive wing portions describing laminae facing said re-entrant part, and means for moving said tuning means in a direction substantially transverse to said laminae between an outer zone of the resonator and the re-entrant part thereof, at least a substantial part of the path swept by said tuning means on movement thereof when the path is produced past the re-entrant part lying on opposite sides of said re-entrant part, said tuning means being dimensioned to cause capacitive tuning of said resonator in response to movement of said wing portions, together with inductive tuning substantially counteracting an increase in the capacitive tuning rate as the tuning means approaches said re-entrant part.

3. A resonator according to claim 2 wherein said wing portions are spaced apart to reduce the part of said produced path intercepted by said re-entrant part.

4. A resonator according to claim 3 wherein said wing portions are mounted on separate parallel rods which project into the resonator through the side wall thereof, said rods constituting said means for moving said wing portions.

5. A resonator according to claim 2 wherein said tuning means has a relatively narrow portion connecting said wing portions to reduce that part of said produced path intercepted by said re-entrant part.

6. A hollow electrical resonator having a re-entrant part and having tuning means comprising two wing portions describing laminae facing said re-entrant part and including an angle of less than 180° when viewed from the re-entrant part, and means for moving said tuning means in a direction substantially transverse to said laminae between an outer zone of the resonator and the re-entrant part thereof, at least a substantial part of the path swept by said tuning means on movement thereof when said path is produced past the re-entrant part lying on opposite sides of said re-entrant part, said tuning means being dimensioned to cause capacitive tuning of said resonator in response to movement of said tuning means, together with inductive tuning substantially counteracting an increase in the capacitive tuning rate as the tuning means approaches said re-entrant part.

7. A hollow electrical resonator having a re-entrant part and having tuning means comprising two wing portions describing laminae facing said re-entrant part and including an angle of substantially 90° when viewed from the re-entrant part, and means for moving said tuning means in a direction substantially transverse to said laminae between an outer zone of the resonator and the re-entrant part thereof, at least a substantial part of said path swept by said tuning means on movement thereof when the path is produced past the re-entrant part lying on opposite sides of said re-entrant part, said tuning means being dimensioned to cause capacitive tuning of said resonator in response to movement of said tuning means, together with inductive tuning substantially counteracting an increase in the capacitive tuning rate as the tuning means approaches said re-entrant part.

8. A hollow electrical resonator having a re-entrant part and having tuning means comprising at least one metal plate facing said re-entrant part, and means for producing a tuning movement of said metal plate from an outer zone of the resonator to the re-entrant part thereof and vice versa, the moving plate having a substantial effective area normal to the direction of tuning movement so that at least a substantial part of the path swept by said metal plate on movement thereof when the path is produced past the re-entrant part lying to one side of said re-entrant part, said metal plate being dimensioned to cause capacitive tuning of said resonator in response to movement of said metal plate, together with inductive tuning substantially counteracting an increase in the capacitive tuning rate as said metal plate approaches said re-entrant part.

9. In a klystron valve, a hollow electrical resonator having a re-entrant part constituting a capacitive gap in said klystron valve, tuning means comprising two conductive wing portions facing said re-entrant part and means for moving said conductive wing portions within the resonator between an outer zone and the re-entrant part thereof, at least a substantial part of the path swept by said wing portions passing, when produced, on opposite sides of said re-entrant part, said wing portions being dimensioned to cause capacitive tuning of said resonator in response to movement of said wing portions, together with inductive tuning substantially counteracting an increase in the capacitive tuning rate as said wing portions approach said re-entrant part.

References Cited in the file of this patent

UNITED STATES PATENTS

| | | |
|---|---|---|
| Re. 22,990 | Hansen et al. | Mar.23, 1948 |
| 2,286,396 | Trevor | June 16, 1942 |
| 2,444,066 | Rostas | June 29, 1948 |
| 2,587,136 | Gardner | Feb. 26, 1952 |
| 2,617,071 | Chodorow | Nov. 4, 1952 |
| 2,647,952 | Smullin | Aug. 4, 1953 |
| 2,656,484 | Cork | Oct. 20, 1953 |
| 2,736,868 | Bell | Feb. 28, 1956 |
| 2,779,873 | Tykulsky | Jan. 29, 1957 |

FOREIGN PATENTS

| | | |
|---|---|---|
| 106,681 | Austria | Feb. 17, 1939 |
| 892,097 | France | Jan. 3, 1944 |